(12) United States Patent
I et al.

(10) Patent No.: US 8,907,213 B2
(45) Date of Patent: Dec. 9, 2014

(54) ELECTRIC JUNCTION BOX

(75) Inventors: Sunsoku I, Makinohara (JP); Masahiro Akahori, Makinohara (JP)

(73) Assignee: Yazaki Corporation, Tokyo (JP)

(*) Notice: Subject to any disclaimer, the term of this patent is extended or adjusted under 35 U.S.C. 154(b) by 77 days.

(21) Appl. No.: 13/559,680

(22) Filed: Jul. 27, 2012

(65) Prior Publication Data

US 2013/0025930 A1 Jan. 31, 2013

(30) Foreign Application Priority Data

Jul. 28, 2011 (JP) .................................. 2011-165616

(51) Int. Cl.
    *H05K 5/00*     (2006.01)
    *B60R 16/023*     (2006.01)

(52) U.S. Cl.
    CPC ................... *B60R 16/0238* (2013.01)
    USPC ............................. 174/50; 174/562; 439/76.2

(58) Field of Classification Search
    USPC ............................. 174/520, 50, 562; 439/76.2
    See application file for complete search history.

(56) References Cited

U.S. PATENT DOCUMENTS

| | | | |
|---|---|---|---|
| 5,788,529 A * | 8/1998 | Borzi et al. | 439/364 |
| 7,189,921 B2 * | 3/2007 | Andresen et al. | 174/50 |
| 7,931,479 B1 * | 4/2011 | De La Reza et al. | 439/76.2 |
| 8,376,758 B2 * | 2/2013 | Sell | 439/35 |
| 8,437,119 B2 * | 5/2013 | Tagano | 361/657 |
| 8,475,102 B2 * | 7/2013 | Haylock et al. | 411/361 |
| 8,633,383 B2 * | 1/2014 | Akahori et al. | 174/50 |
| 2005/0026471 A1 * | 2/2005 | Kobayashi | 439/76.2 |
| 2005/0153583 A1 * | 7/2005 | Kawamura et al. | 439/76.2 |
| 2005/0181644 A1 * | 8/2005 | Saka et al. | 439/76.2 |
| 2011/0249379 A1 * | 10/2011 | Shirasaka et al. | 361/679.01 |

FOREIGN PATENT DOCUMENTS

| | | | |
|---|---|---|---|
| JP | 06-165345 A | | 6/1994 |
| JP | 2011223767 A | * | 11/2011 |

* cited by examiner

*Primary Examiner* — Hung Ngo
(74) *Attorney, Agent, or Firm* — Edwards Wildman Palmer LLP

(57) ABSTRACT

An electric junction box for preventing brackets, while inclined to each other, from being fastened together, comprises a first cassette block and a second cassette block. Brackets of the first block and the second block are stacked onto each other, a bolt is passed through each of the through holes, and the blocks are fastened together. A metal collar formed tubular in nearly eclipse cross-sectional shape is also attached to inner surfaces of the through holes formed into nearly ellipse cross-sectional shape. Each of the collars is attached to each of the brackets so that long axes of the collars intersect to each other.

3 Claims, 6 Drawing Sheets

ELECTRIC JUNCTION BOX

This application is on the basis of Japanese Patent Application NO. 2011-165616, the contents of which are hereby incorporated by reference.

TECHNICAL FIELD

This invention relates to an electric junction box installed into an automobile, in particular to an electric junction box having a plurality of cassette blocks.

BACKGROUND ART

There have been advocated various electric junction boxes installed into an automobile in accordance with a type of the automobile, for example, such as an electric junction box 210 as illustrated in FIG. 6 in which a plurality of blocks 210A and 210B is configured to be joined together (refer to the PTL 1).

The aforementioned block bodies 210A and 210B are each provided with brackets 215 and 218 where through holes 216 may be formed, which brackets 215 and 218 are stacked together, and bolted to each other by passing a bolt through the through holes 216, so that the block bodies 210A and 210B are assembled to each other.

CITATION LIST

Patent Literature

[PTL 1]
Japanese Patent Application Laid-Open Publication No. 6-165345

SUMMARY OF INVENTION

Technical Problem

To the aforementioned through holes 216 of the brackets 215 and 218 that are made of synthetic resin, metal collars may be attached. This is because the brackets 215 and 216 may be prevented of breakage by fastening torque of the bolt 220. The collars are formed into a cylinder shape along an inner surface of the through hole 216.

Notwithstanding, there has been a drawback that when the collars are attached to the brackets 215 and 218, a partial end face of one of the collars, upon stacking the brackets 215 and 218 onto each other, falls into inside the other collar, so that the bolt, while the brackets 215 and 218 are inclined to each other, is fastened.

Accordingly, it is an object of the invention to provide an electric junction box for preventing the brackets from being fastened together while inclined to each other.

Solution to Problem

In order to attain the above-mentioned object, a first aspect of the present invention provides an electric junction box comprising a first cassette block; a second cassette block, each of the first and second blocks including a bracket having a through hole; and a metal collar attached to an inner surface of the through hole, wherein the first and the second blocks are bolted to each other such that the brackets are stacked together and a bolt is passed through each of the through holes, wherein each of the through holes is formed into nearly ellipse cross-sectional shape, and each of the collars is formed tubular in nearly ellipse cross-sectional shape, and wherein each of the collars is attached to each of the brackets so that long axes of the collars intersect to each other.

Advantageous Effects of Invention

According to the first aspect of the invention, since the metal collar is attached to the inner surface of the through hole, wherein each of the through holes is formed into nearly ellipse cross-sectional shape, and each of the collars is formed tubular in nearly ellipse cross-sectional shape, and wherein each of the collars is attached to each of the brackets so that long axes of the collars intersect to each other, it is made possible to stack the brackets to each other stably without their being inclined because end faces of the one collar and the other collar usually contact with their four points. Accordingly, it is also made possible to prevent the brackets from being fastened to each other with the bolt while inclined to each other.

DESCRIPTION OF EMBODIMENTS

An electric junction box according to one embodiment of the present invention will be hereinafter discussed with reference to FIGS. 1 to 5. The electric junction box is installed in an automobile, and is designed to supply power or signal to electric devices mounted in the automobile. Herein, a junction block (referred to as junction block), a fuse block (referred to as fuse box), and a relay block (referred to as relay box) are collectively referred to as electric junction box.

Figure 1:
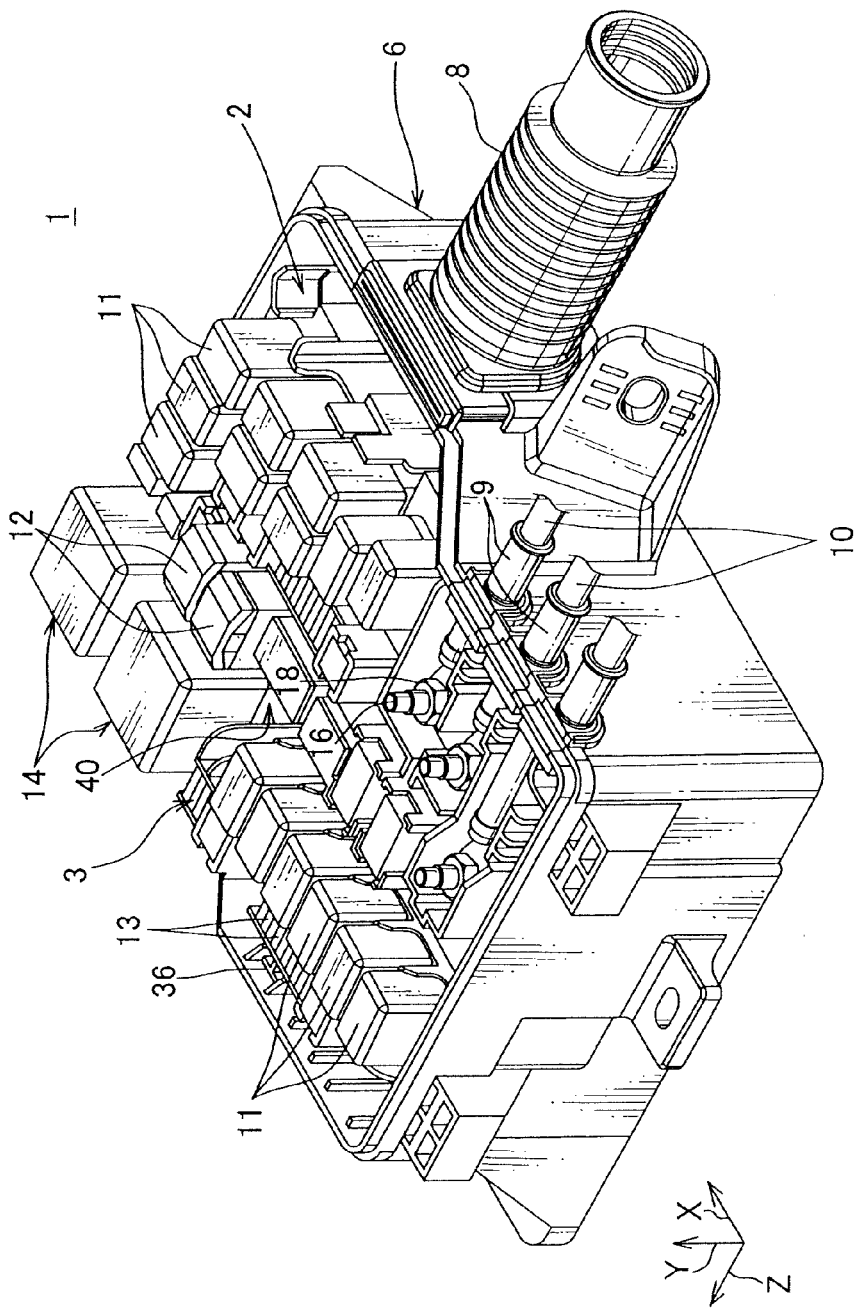
FIG. 1 is a perspective view illustrating an electric junction box according to one embodiment of the present invention.
Figure 2:
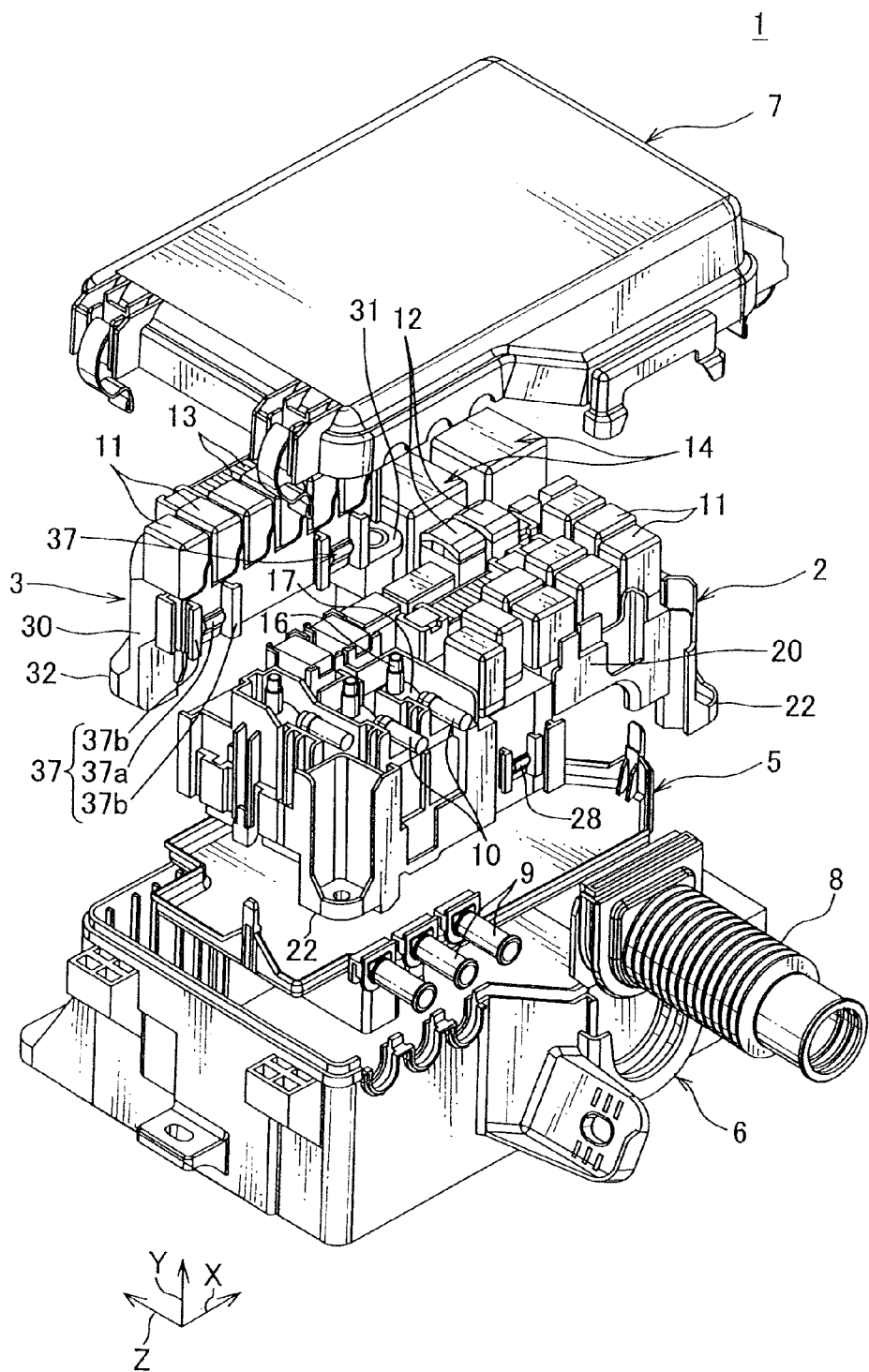
FIG. 2 is an exploded view of the electric junction box illustrated in FIG. 1.

The electric junction box, as shown in FIGS. 1, 2, is provided with a plurality of electric components 11, 12, 13, and 14, a bus bar 15 that is a distributing member, a first cassette block 2, a second cassette block 3, a third cassette block 40 to which the plurality of electric components 11, 12, 13, and 14, and the bus bar 15 are attached, an inner cover 5 attached to a lower face of these cassette blocks 2, 3, and 40, a main body case 6 accommodating the cassette blocks 2, 3, and 40 and the inner cover 5, an upper cover 7 covering an upper surface of the main body case 6, a grommet 9 attached to a circumference of the power source line drawn into the main body case 6 and waterproofing the main body case 6, and a grommet 8 attached to a circumference of a bundle of electric wires (not shown) drawn out of the main body case 6 and waterproofing the main body case 6.

Figure 3:
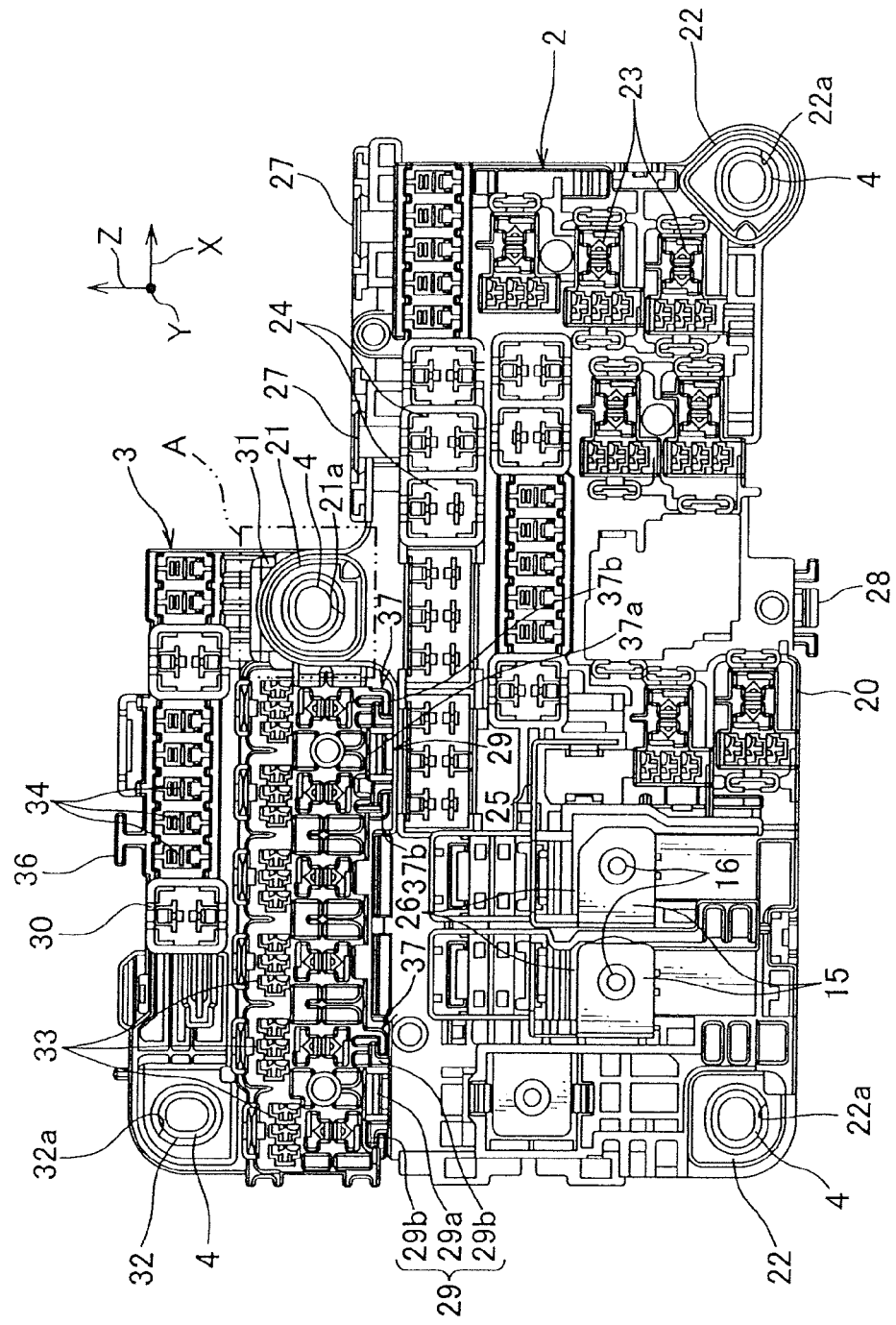
FIG. 3 is a plane view of a first cassette block and a second cassette block illustrated in FIG. 2.
Figure 4:
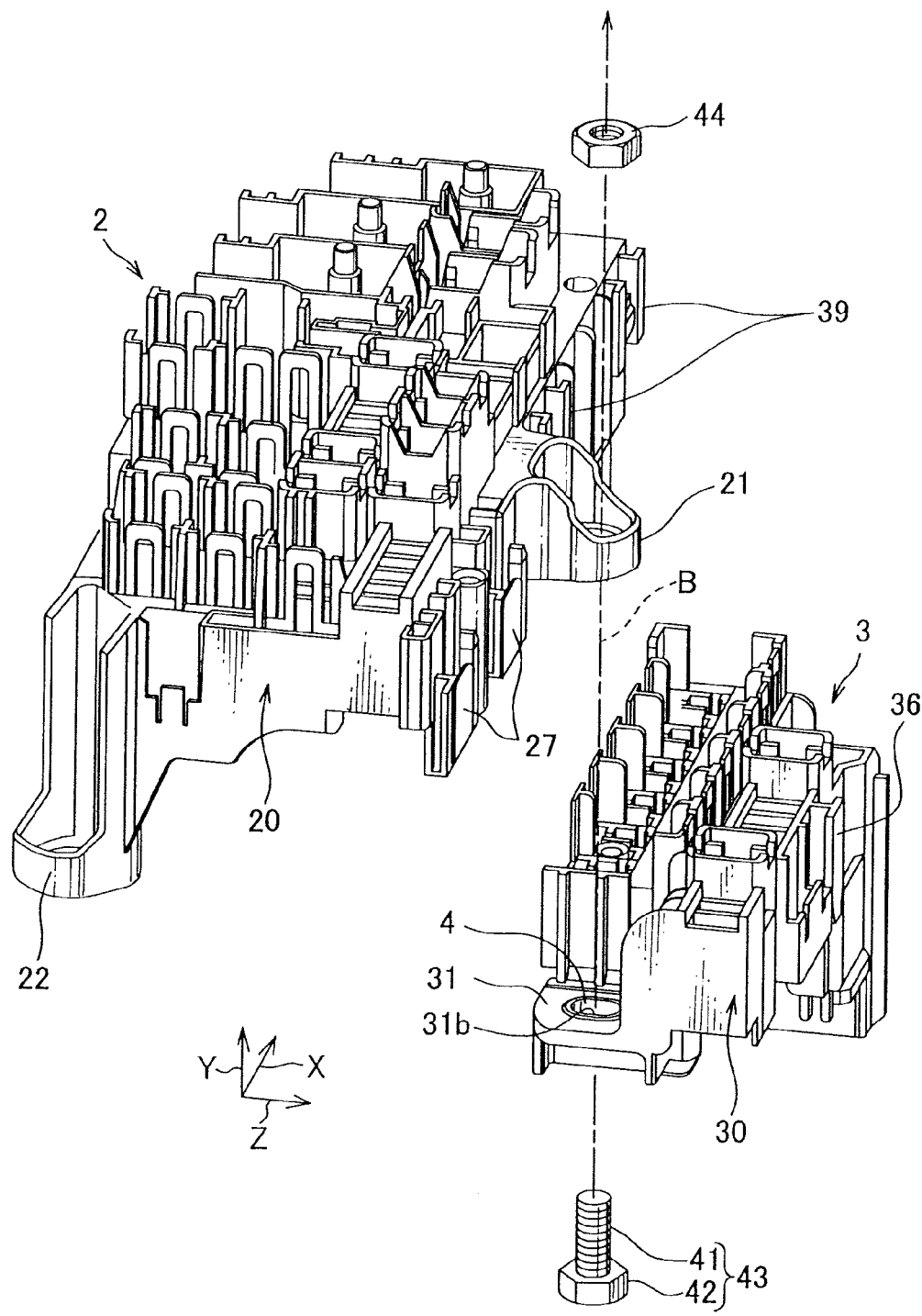
FIG. 4 is a perspective view of the first cassette block and the second cassette block illustrated in FIG. 3.

The aforementioned first cassette block 2 is made of synthetic resin, and as shown in FIGS. 3 and 4, is provided with a block-shaped main body 20, a plurality of brackets 21 and 22, and a plurality of lock parts 27, 28, and 29.

The aforementioned main body 20 is provided with a component-attaching parts 23 and 24 to which electric components 11 and 12 are attached, a bus bar-attaching groove 25, and a bolt-attaching part 26. The bus bar 15 is obtained so as to press a metal plate. The bolt 16 is the one for fastening a terminal fitting 17 connected with a terminal of the aforementioned power source line 10 and an end of the bus bar 15.

The aforementioned bracket 21 is disposed on the outer surface of the main body 20, and is provided with a through hole 21a passing axis 41 of the bolt 43 therethrough. This bracket 21, as shown by the arrow B in FIG. 4, is stacked onto the bracket 31 disposed in the second cassette block 3 so as to be fastened to the bracket 31 with the bolt 43 and the nut 44. Furthermore, these brackets 21 and 31 correspond to brackets recited in the scope of claims. The aforementioned bracket 22 is disposed on a corner of the main body 20, and is provided with a through hole 22a passing the bolt therethrough. This bracket 22 is fixed to the bolt attached to a bottom wall of the main body case 6. Moreover, to inner surfaces of the through holes 21a and 22a of the brackets 21 and 22, metal collars 4 are each attached.

The aforementioned locking part 27, 28, and 29 are disposed on an outer surface of the main body 20. Into the locking part 27 a locking part disposed in the third cassette block 40 is locked. Into the locking part 28 a locking part disposed on a side wall of the main body case 6 is locked. Into the locking part 29 a locking part 37 disposed in the second cassette block 3 is locked. This locking part 29 is composed of a pair of rails 29b, and a locking projection 29a that is disposed between the pair of rails 29b.

The aforementioned second cassette block 3 is made of synthetic resin and, as shown in FIGS. 3 and 4, is provided with a block-shaped main body 30, a plurality of brackets 31 and 32, and a plurality of locking parts 36 and 37.

The aforementioned main body 30 is provided with component-attaching parts 33 and 34, and bus bar-attaching groove (not shown).

The aforementioned bracket 31 is disposed on a corner of the main body 30, and is provided with a through hole 31a passing axis 41 of the bolt 43 therethrough. This bracket 31, as mentioned above, is stacked onto the bracket 21 disposed in the first cassette block 2 so as to be fastened to the bracket 21 with the bolt 43 and the nut 44. The aforementioned bracket 32 is disposed on another corner of the main body 30, and is provided with a through hole 32a passing bolt therethrough. This bracket 32 is fixed to a bolt that is attached to the bottom wall of the main body case 6. Moreover, to inner surfaces of the through holes 31a and 32a of the brackets 31 and 32, metal collars 4 are each attached.

The locking parts 36 and 37 are disposed an outer surface of the main body 30. Into the lock receiving part 36 a locking part disposed on the side wall of the main body case 2 is locked. Into the lock receiving part 37 a locking part 29 disposed in the first cassette block 2 is locked. The locking part 37 is composed of a pair of rails 37b extending in the arrow Y direction, and a locking projection 37a that is disposed between the pair of rails 37b. The pair of rails 37b positions the pair of rails 29b movably in the arrow Y direction. The locking projection 37a is locked into the locking projection 29a.

The third cassette block 40 is made of synthetic resin, and holds the electric component 14 and the electric wire of wire harness that is connected with the electric component 14. The third cassette block 40 as described above is attached to the outer surface of the main body 20 of the first cassette block 2.

The aforementioned electric junction box 1 is assembled in such procedure as below.

First, each component such as the bolt 16, the bus bar 15, and the plurality of electric components 11, 12, 13, and 14 is mounted to each of cassette blocks 2, 3, and 40. Then, the plurality of electric wire of wire harness is connected to each of electric components 11, 12, 13, and 14, and bus bar 15.

Then, a terminal fitting of a terminal of the power source line 10 and the end of the bus bar 15 are fastened together with the bolt and the nut.

Then, the locking part 29 of the first cassette block 2 and the locking part 37 of the second cassette block 3 are approached to each other in the arrow Y direction to be locked. Subsequently, into the through holes 21a and 31a of the brackets 21 and 31 that are stacked to each other, the bolt 43 is passed; the nut 44 is thread into the bolt 43; the brackets 21 and 31 are fastened to each other. Thus the first cassette block 2 and the second cassette block 3 are assembled.

Then, the locking part 27 of the first cassette block 2 and the locking part of the third cassette block 40 are approached to each other in the arrow Y direction, and thus the first cassette block 2 and the second cassette block 3 are assembled.

Then, to a bottom surface of the cassette blocks 2, 3, and 4 that are assembled to each other the inner cover 5 is attached. The cassette blocks 2, 3, and 40 and the inner cover 5 are inserted into the main body case 6; each bolt attached to the bottom wall of the main body case 6 is inserted into the through holes 22a and 32a of each of the brackets 22 and 23; the nut is threaded into each bolt; and the cassette blocks 2, 3, and 40 and the inner cover 5 are fixed to the main body case 6.

Then, the grommet 9 attached to a circumference of the power source line 10, and the grommet 8 attached to a circumference of the electric wire bundle of the wire harness are attached to each through hole disposed in the main body case 6. Then, to an upper surface of the main body case 6 the upper cover 7 is attached. The electric junction box 1 is assembled in such procedure.

The electric junction box 1 of the present invention as mentioned above is configured such that the first cassette block 2 and the second cassette block 3 are first assembled, then these blocks are inserted together into the main body case 6. Thus, if the bracket 21 of the first cassette block 2 and the bracket 31 of the second cassette block 3 are inclined to be fastened together, the through holes 22a and 32a of other brackets 22 and 32 are displaced relative to the bolt attached to the bottom wall of the main body case 6, inducing problem that it becomes difficult to pass the bolt into these through holes 22a and 32a. Therefore, in the present invention, employing structure which will be discussed below makes it possible to prevent from fastening the bracket 21 of the first cassette block 2 and the bracket 31 of the second cassette block 31 together by the bolt 43 while inclined.

Figure 5:
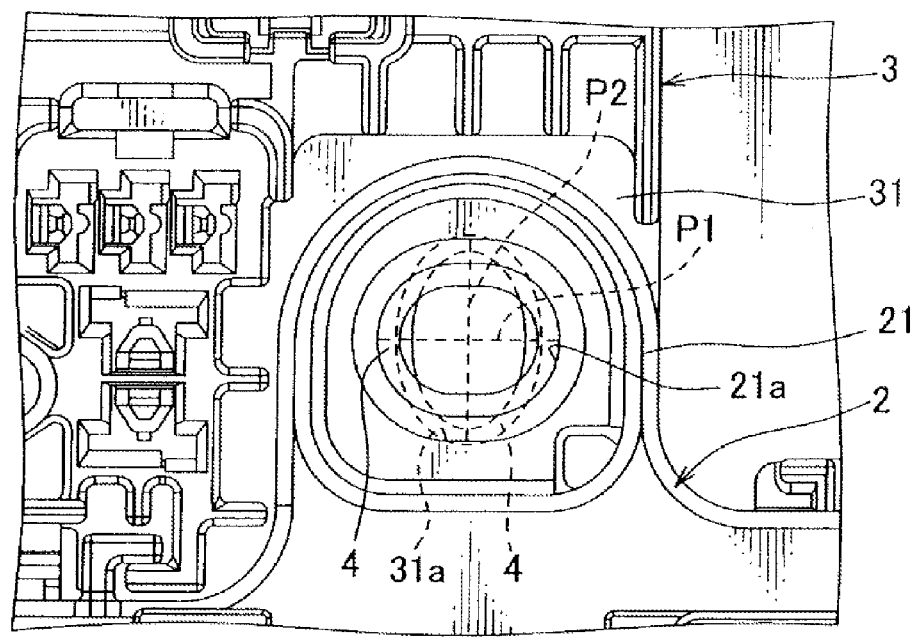
FIG. 5 is an enlarged view of part A in FIG. 3.
Figure 6:
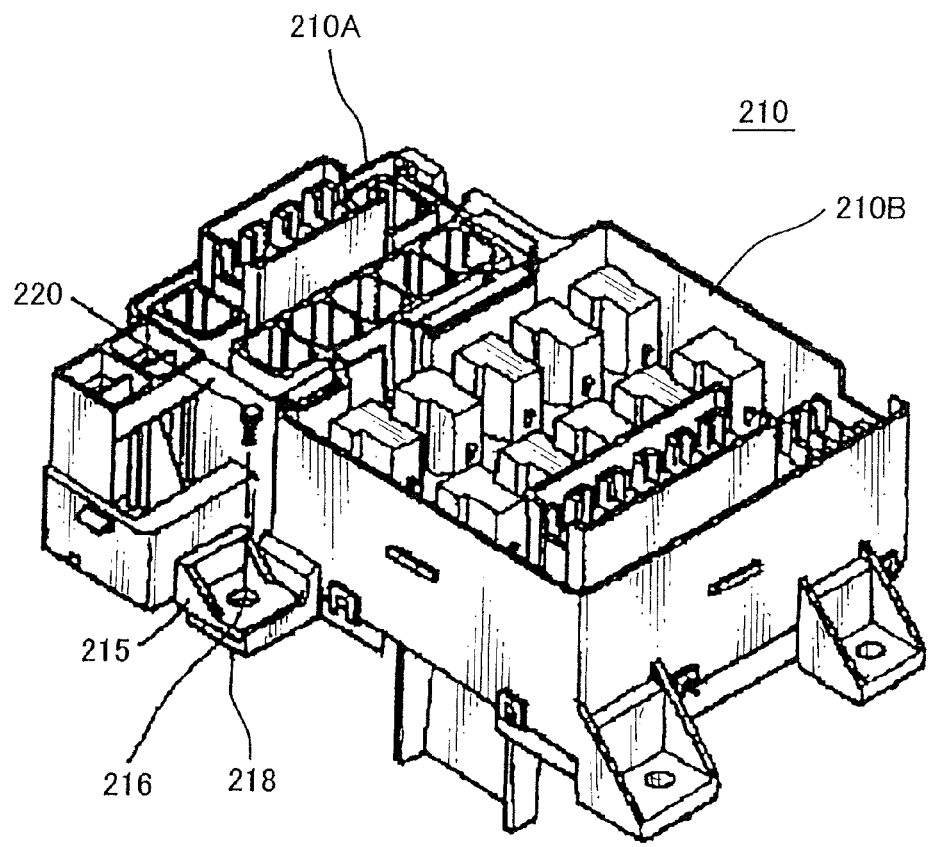
FIG. 6 is a perspective view illustrating a conventional electric junction box.

Namely, as shown in FIG. 5, in the present invention, each of the brackets 21a and 31a is nearly eclipse cross-sectional shaped, each collar 4 adapted to be attached to the inner surface of each of the through holes 21a and 31a is formed tubular in nearly the same eclipse shape as each of the through holes 21a and 31a. Furthermore, each of the collars 4 is attached to each of the brackets 21 and 31 so that the long axes of the collars 4 intersect to each other.

Furthermore, the collars 4 is designed to avoid damage of the brackets 21 and 31 by fastening torque of the bolt 43, and is attached to the inner surface of the through holes 21a and 31a by injection molding or press-fitting. Opposite sides of the collars in an axis direction slightly project from each of the through holes 21a and 31a. Furthermore, in the present embodiment, as shown in FIG. 5, a long axis P1 of the collar 4 at the bracket 21 side is arranged perpendicular to a long axis P2 of the collar 4 at the bracket 31 side. A head 42 of the bolt 43 is formed not to avoid passing the inner side of the collar 4.

By virtue of the aforementioned structure, if there is certain component dimension error occurs in the first cassette block 2 and the second cassette block 3, edge surfaces of the collar 4 of the bracket 21 side and the collar 4 of the bracket 31 side are usually contact with each other with four points, making it possible to stack the brackets 4 stably without their being inclined to each other. Thus it is made possible to prevent the brackets from fasten together to each other while inclined. Therefore, when inserting the cassette blocks 2, 3, and 40 and the inner cover 5 into the main body case 6, the bolt attached to the bottom wall of the main body case 6 are securely passed through each of the through holes 22a and 32a.

It is to be understood the present invention is just shown by the aforementioned embodiment as a typical embodiment but is not limited to this embodiment. Therefore, unless otherwise such changes and modifications depart from the scope of the present invention hereinafter defined, they should be construed as being included therein.

REFERENCE SIGNS LIST

1 electric junction box
2 first cassette block
3 second cassette block
4 collar
21, 31 bracket
21a, 31a through hole
P1, P2 long axis

The invention claimed is:

1. An electric junction box, comprising:
a first cassette block;
a second cassette block, each of the first and second blocks including a bracket having a through hole; and
a metal collar attached to an inner surface of the through hole,
wherein the first and the second blocks are bolted to each other such that the brackets are stacked together and a bolt is passed through each of the through holes,
wherein each of the through holes is formed into nearly ellipse cross-sectional shape, and each of the collars is formed tubular in nearly ellipse cross-sectional shape, and
wherein each of the collars is attached to each of the brackets so that a long axis of each ellipse of each of the collars intersects each other.

2. The electric junction box according to claim 1, wherein the long axis intersects each other at a right angle.

3. The electric junction box according to claim 1, wherein the collars contact each other with four points.

\* \* \* \* \*